UNITED STATES PATENT OFFICE.

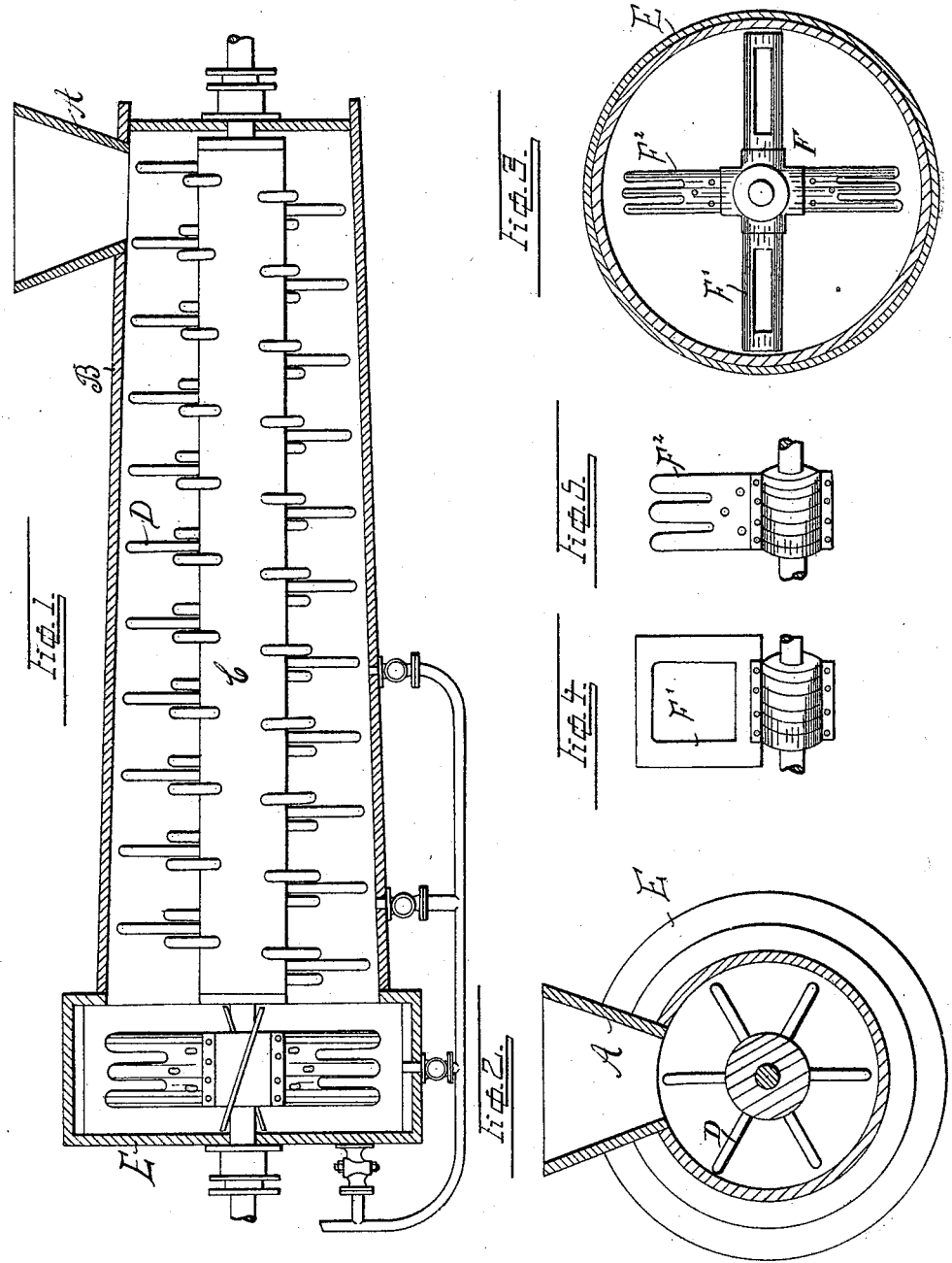

ROBERT DIETRICH, OF MERSEBURG, GERMANY.

SEPARATOR FOR CELLULOSE.

SPECIFICATION forming part of Letters Patent No. 617,983, dated January 17, 1899.

Application filed May 21, 1898. Serial No. 681,341. (No model.)

*To all whom it may concern:*

Be it known that I, ROBERT DIETRICH, manufacturer, a subject of the King of Prussia, German Emperor, residing at Merseburg, Kingdom of Prussia, Germany, have invented an Improved Separator for Cellulose, of which the following is a specification.

In the manufacture of cellulose the cellulose issuing from the digester must be beaten up and separated before being conducted to the washing apparatus. This has hitherto been effected by causing the cellulose to pass through separators (such as cylindrical mills, vessels provided with spiral passages, or crushing appliances) of at least four and one-fourth to five meters in length. These separators consist of troughs within which are arranged long wooden cylinders or shafts, these latter being provided with spirally-arranged wooden beaters. Usually the cellulose is passed through two such separators, which are arranged either side by side or obliquely one below the other; but owing to their size they occupy a large space and require considerable power for driving them.

This invention relates to a separator of this kind which, although compact in form and requiring but little driving power, effects a complete separation of the cooked cellulose balls in a very short time.

My improved separator is illustrated in the accompanying drawings, in which—

Figure 1 is a longitudinal section through the same. Figs. 2 and 3 are cross-sections showing various constructional details, and Figs. 4 and 5 are detail views of the separator-blades.

The essentially novel feature of this invention is the combination of two differently-acting parts upon one shaft in such a manner that a reducing apparatus similar to those employed in separators as hitherto constructed and which serves for the preliminary treatment of the cellulose, preferably by the dry method, is combined with a special reducing apparatus constructed after the manner of kneading-machines working by the wet method, which latter apparatus rapidly and with the expenditure of very little power completely reduces and uniformly kneads the cellulose, which has already been rendered friable. The combination of the two processes effected by my improved separator considerably reduces the time required for carrying them out, and owing to the smaller space which the apparatus occupies it may be arranged immediately beneath the digester or in any desired position.

The cellulose issuing from the digester enters that portion of the separator which acts upon it in a dry state through the hopper A. This portion of the separator consists of a drum B, which gradually increases in diameter proceeding from the inlet, and a cylinder or shaft C, which is provided upon its circumference with a suitable number of spirally-arranged wooden rods or beaters D, Figs. 1 and 2. The conical form of the drum B serves to accelerate the passage of the dry cellulose, which is caused to move forward owing to the projections upon the shaft, by which latter it is at the same time separated. After its passage through the dry separator B the substance reaches a cylindrical vessel E, in which the conversion of the cellulose into a thick pulpy mass of the greatest homogenity is effected by means of water.

The vessel E is of larger diameter than the adjacent end of the drum of the dry separator, so that any tendency of the water employed to flow into the drum is counteracted as far as possible. The shaft of the dry separator also passes through the vessel E; but the portion of the said shaft within this latter is provided with a special appliance F, Fig. 3. This appliance is so formed that the substance to be treated is worked within the vessel E in a manner similar to that of a kneading-machine. The construction of the device F may of course be readily modified. In the drawings it is illustrated as an arrangement of blades resembling a ship's propeller upon the shaft, each alternate blade being, however, formed differently from that preceding it. One half $F'$ of the blades are frame-shaped, as shown in Fig. 4, while the blades $F^2$, arranged between them, form striking-arms, as illustrated in Fig. 5, the outer ends of which may be constructed with fingers or which may, if desired, be divided throughout their whole length. The spiral arrangement of these blades is preferably such that with four blades the obliquity of the same amounts to at least a quarter-turn, so that the backwardly-turned edge of one blade lies at least in a plane with the forwardly-bent edge of the succeeding blade. By this means an uninterrupted working of the substance is obtained in passing round the casing, by means of which both a separation and a kind of kneading of the mass of cellulose is effected, so that the right degree of decomposition is attained, the frame-shaped arms F', which pass over the walls of the vessel, serving to stir the mass, while the hand-shaped arms F², which pass through the intermediate space, drive and strike it, so that an uninterrupted working of the cellulose is obtained, thereby greatly accelerating the operation.

The casing or body of the apparatus is provided with water inlet and outlet pipes, running-off pipe for the substance treated, &c. The combined and improved action of the apparatus enables its entire length to be reduced to four meters, while the number of revolutions may be diminished to one-half or a quarter of those previously necessary.

What I claim is—

1. An apparatus for digesting and beating up and separating cellulose, consisting of a drum, a shaft extending through the drum and provided along its length with a plurality of radial blades or beaters, a cylindrical separator connected with one end of the drum and having a shaft provided with radial stirring-blades and radial stirring-fingers, substantially as described.

2. The combination, in an apparatus for digesting and beating up and separating cellulose, of a drum, a shaft extending through the drum and provided with blades or beaters, and a cylindrical separator connected with one end of the drum and composed of a casing, and a shaft provided with frame-shaped blades F' and hand-shaped blades F², said hand-shaped blades passing through the space not traversed by the frame-shaped blades, substantially as described.

In testimony whereof I have hereunto set my hand, in presence of two subscribing witnesses, this 21st day of April, 1898.

ROBERT DIETRICH.

Witnesses:
GODFREY KRITZLER,
REINHOLD LEHMANN.